United States Patent [19]

Flory, IV

[11] Patent Number: 5,532,553
[45] Date of Patent: Jul. 2, 1996

[54] OPERATING CIRCUIT FOR ELECTROLUMINESCENT PANEL

[75] Inventor: Isaac L. Flory, IV, Blacksburg, Va.

[73] Assignee: Hubbell Incorporated, Orange, Conn.

[21] Appl. No.: 325,901

[22] Filed: Oct. 19, 1994

[51] Int. Cl.$^6$ ................................................ G09G 3/10
[52] U.S. Cl. .................. 315/169.3; 315/283; 315/241 R; 315/243
[58] Field of Search .............................. 315/169.3, 283, 315/241 R, 242, 243

[56] References Cited

U.S. PATENT DOCUMENTS

| | | | |
|---|---|---|---|
| 3,749,977 | 7/1973 | Silker | 315/276 |
| 4,253,097 | 2/1981 | Hochstrate | 340/781 |
| 4,890,041 | 12/1989 | Nuckolls et al. | 315/225 |
| 5,345,146 | 9/1994 | Koenck et al. | 315/169.3 |

*Primary Examiner*—Frank Gonzalez
*Assistant Examiner*—Reginald A. Ratliff
*Attorney, Agent, or Firm*—Jerry M. Presson; John E. Holmes

[57] ABSTRACT

The light output of an electroluminescent panel is increased by using resonant transformation to increase the operating voltage across the panel to a level greater than the source or input voltage. This is accomplished by connecting the electroluminescent panel into a series resonant circuit whose capacitance value is made up at least in part of the intrinsic capacitance of the electroluminescent panel itself, and by choosing the inductance and capacitance values of the series resonant circuit to produce the desired output voltage across the electroluminescent panel. The resulting circuit is simple and low in cost, does not significantly add to the operating losses of the system, and takes advantage of the intrinsic capacitance of the panel in providing the desired resonant transformation.

15 Claims, 3 Drawing Sheets

5,532,553

OPERATING CIRCUIT FOR ELECTROLUMINESCENT PANEL

FIELD OF THE INVENTION

The present invention relates to an operating circuit for increasing the AC voltage across an electroluminescent panel in order to increase the light output of the panel. More specifically, the invention relates to an operating circuit which uses resonant transformation to increase the voltage across an electroluminescent panel to a value greater than the AC source voltage.

BACKGROUND OF THE INVENTION

Electroluminescent panels are used in a variety of lighting applications where low power consumption, extended lifetime and compact size are desired. Examples of such applications include illuminated exit signs, outdoor address plaques, and the like. The electroluminescent panel is generally connected directly to an AC source, and provides a light output which is a function of the applied voltage and frequency. Power consumption is very low, typically on the order of 0.1 watt.

The principal drawback of electroluminescent panels is low light output. A typical electroluminescent panel construction consists of a steel substrate carrying various dielectric, phosphor and conductive layers that are applied by screen printing or spraying. By optimizing the fabrication process, the light output of the resulting electroluminescent panel can be increased considerably. However, there is a practical limit on the light output that can be obtained without increasing the operating voltage or frequency of the panel.

An increase in the operating frequency of an electroluminescent panel, while possible in theory, requires a substantial investment in additional circuitry. This is undesirable for many of the applications in which electroluminescent panels are used, since the cost of the resulting product is increased and its reliability may be adversely affected. The other method of increasing brightness is to increase the operating voltage of the panel, which can be done by means of a transformer. However, the additional cost and weight of a transformer is undesirable in many applications, and the losses introduced by the transformer can reduce the operating efficiency of the electroluminescent panel. Accordingly, a need exists for a simple method of increasing the light output of an electroluminescent panel, without significantly affecting its cost, operating efficiency or reliability.

SUMMARY OF THE INVENTION

Accordingly, it is a primary object of the present invention to increase the light output of an electroluminescent panel without significantly increasing the cost, reliability or operating efficiency of the panel.

It is a further object of the present invention to increase the operating voltage an electroluminescent panel to a level greater than the source or input voltage, without the need for a transformer.

It is a still further object of the present invention to provide an operating circuit for an electroluminescent panel which allows the panel voltage to be increased or decreased in order to vary the brightness level of the panel.

The foregoing objects are substantially achieved by providing an operating circuit which uses resonant transformation to increase the voltage across an electroluminescent panel. The operating circuit comprises first and second input terminals adapted to be connected to an AC voltage source, and a series resonant circuit including an inductor and a capacitor connected in series with each other. The series resonant circuit is connected across the first and second input terminals of the operating circuit. The operating circuit also includes first and second output terminals which are adapted to be connected to an electroluminescent panel, with the first output terminal being connected to the node between the inductor and one terminal of the capacitor of the series resonant circuit, and the second output terminal being connected to a second terminal of the capacitor. In this way, the electroluminescent panel is connected in parallel with the capacitor of the series resonant circuit. The values of the inductor and capacitor of the series resonant circuit are selected to produce an AC voltage across the output terminals that is greater than AC voltage of the source when an electroluminescent panel is connected to the output terminals, thereby increasing the light output of the panel.

In accordance with a further aspect of the invention, an electroluminescent panel circuit comprises an AC voltage source and a series resonant circuit connected across the AC voltage source. The series resonant circuit has as an element thereof an electroluminescent panel having an intrinsic capacitance. The series resonant circuit has an inductance value and a capacitance value, with the capacitance value comprising at least in part the intrinsic capacitance of the electroluminescent panel. At least one of the inductance value and the capacitance value of the series resonant circuit is selected to produce an AC voltage across the electroluminescent panel that is greater than the AC voltage of the source, thereby increasing the light output of the panel.

In accordance with a still further aspect of the present invention, a method for increasing the voltage across an electroluminescent panel comprises the steps of connecting an electroluminescent panel having an intrinsic capacitance into a series resonant circuit having an inductance value and a capacitance value, with the capacitance value comprising at least in part the intrinsic capacitance of the electroluminescent panel; connecting the series resonant circuit across an AC voltage source; and selecting at least one of the inductance value and capacitance value of the series resonant circuit to produce an AC voltage across the electroluminescent panel that is greater than the AC voltage of the source.

BRIEF DESCRIPTION OF THE DRAWINGS

Referring now to the drawings, which form a part of the original disclosure.

DETAILED DESCRIPTION OF THE PREFERRED EMBODIMENTS

Figure 1:
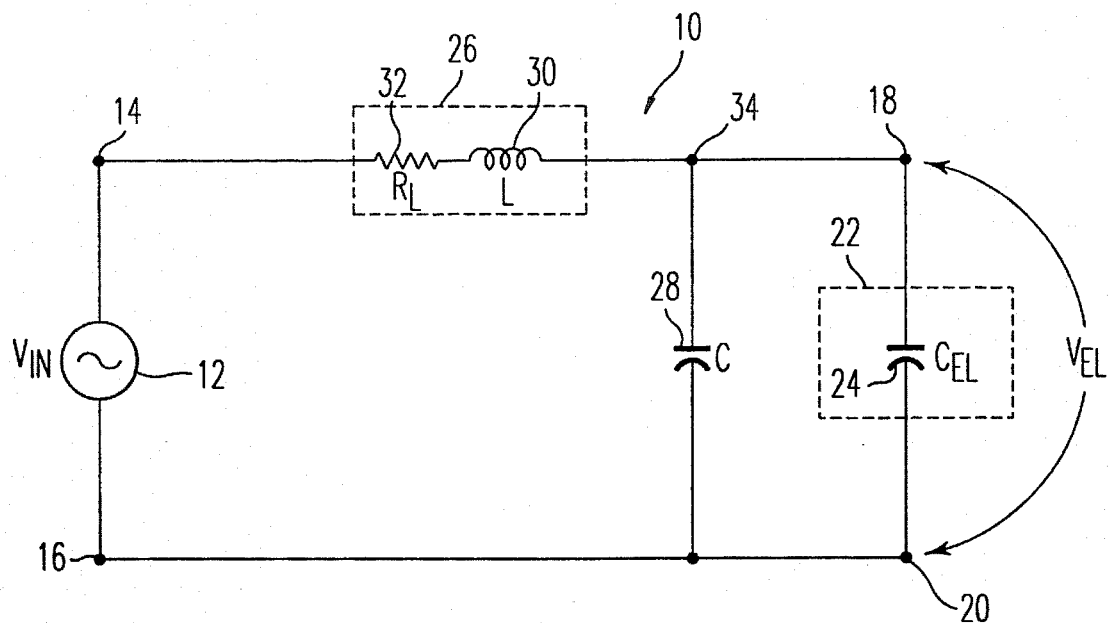
FIG. 1 is a schematic diagram of an electroluminescent panel operating circuit in accordance with the present invention.

A schematic diagram of an electroluminescent panel operating circuit 10 in accordance with the present invention is illustrated in FIG. 1. The circuit is powered by a sinusoidal AC source 12, which will typically consist of a conventional 120-volt AC power supply. The operating circuit comprises first and second input terminals 14 and 16, respectively, which are connected across the AC source 12 as shown. The first and second output terminals 18 and 20, respectively, of the circuit 10 are connected across an electroluminescent panel 22 that is to be powered by the AC source 12. The electroluminescent panel 22 is primarily capacitive in nature, and is represented in FIG. 1 by a capacitor 24 having a value of $C_{EL}$. The output voltage of the operating circuit 10, which appears across the terminals of the electroluminescent panel 22, is indicated as $V_{EL}$ in FIG. 1.

The electroluminescent panel 22 may be of a conventional type and need not be described in detail. In general, the panel will consist of a laminate or sandwich of several alternating layers, typically including one or more dielectric or insulating layers, one or more conductive layers, and an electroluminescent phosphor layer. Electroluminescent panels of the foregoing type are available from Lamplighter Industries of Oak Hill, W. Va., and from other sources. A typical electroluminescent panel measuring 27 cm in length and 17 cm in width has a capacitance of approximately 0.08 microfarads (μF) and a power consumption of approximately 0.1 watt at 120 volts AC.

In order to allow the panel voltage $V_{EL}$ to be increased to a level greater than the input voltage $V_{IN}$ of the AC source 12, the operating circuit 10 is preferably provided in the form of a series resonant (tuned) circuit which carries out a resonant transformation operation on the applied voltage $V_{IN}$. The series resonant circuit includes an inductor or choke coil 26 and a capacitor 28, which are connected in series with each other across the input terminals 14 and 16 of the operating circuit 10. The inductor 26 is electrically equivalent to an ideal inductance 30 having a value L connected in series with a winding resistance 32 having a value $R_L$, as shown in FIG. 1. The capacitor 28 also has an equivalent resistance which in parallel with the ideal capacitance value C, but it has a negligible effect on the operation of the circuit 10 and is therefore not shown in FIG. 1. The node 34 between the inductor 26 and one terminal of the capacitor 28 is coupled to the first output terminal 18 of the operating circuit 10, and the opposite terminal of the capacitor 28 is coupled to the second input terminal 16 and second output terminal 20. In this way, the electroluminescent panel 22 is connected in parallel across the capacitor 28 of the series resonant circuit.

The RMS output voltage $V_{EL}$ across the electroluminescent panel 22 in FIG. 1 can be calculated using standard phasor methods, and is given by the following voltage divider equation:

$$V_{EL} = V_{IN} * [2\pi f(C+C_{EL})] (R_L^2 + (2\pi fL - (2\pi f(C+C_{EL}))^{-1})^2)^{1/2}]^{-1}$$

where $V_{IN}$ is the RMS voltage of the AC source 12, C is the value of the capacitor 28 in farads (F), $C_{EL}$ is the value of the intrinsic panel capacitance 24 in farads (F), $R_L$ is the value of the inductor winding resistance 32 in ohms (Ω), and L is the value of the inductance 30 in henries (H). By appropriate choice of the values of the inductor 26 and capacitor 28, the panel voltage $V_{EL}$ may be set to an average or RMS value greater than the average or RMS value of the supply voltage $V_{IN}$. The instantaneous voltage across the elements of the series resonant circuit must always have a vector sum equal and opposite to the instantaneous source voltage, as dictated by Kirchhoff's voltage law, but the phase differences introduced by the reactive elements of the circuit result in scalar RMS voltages across these elements which do not sum to zero. Although the winding resistance $R_L$ contributes to ohmic circuit losses, it also provides stability over a wide range of operating conditions by damping the oscillations of the series resonant circuit.

In a preferred embodiment of the operating circuit 10, the inductor 26 comprises a Magnetek unit having an inductance L of 1.59 H and a winding resistance of about 95 Ω. The capacitance value C of the capacitor 28 is 1.14 μF, and the intrinsic capacitance of the electroluminescent panel 22 is 0.08 μF. The resulting series resonant circuit (including the intrinsic panel capacitance $C_{EL}$ connected in parallel with the capacitor 28) has a resonant frequency of 114 Hz. For an AC source 12 of 120 volts RMS at 60 Hz, the resulting AC voltage $V_{EL}$ across the electroluminescent panel 22 (calculated from the equation given above) will be 165.4 volts RMS at 60 Hz. This compares favorably with an actual measured value of 164.8 volts RMS. Thus, an increase in panel voltage of approximately 37% is realized, with a corresponding increase in circuit power dissipation of approximately 0.83 watts. As in the disclosed example, it is preferred that the resonant frequency of the operating circuit (in this case 114 Hz) be substantially greater than the frequency of the AC source 12 (60 Hz) in order to avoid oscillatory instabilities at low circuit impedance.

Figure 2:
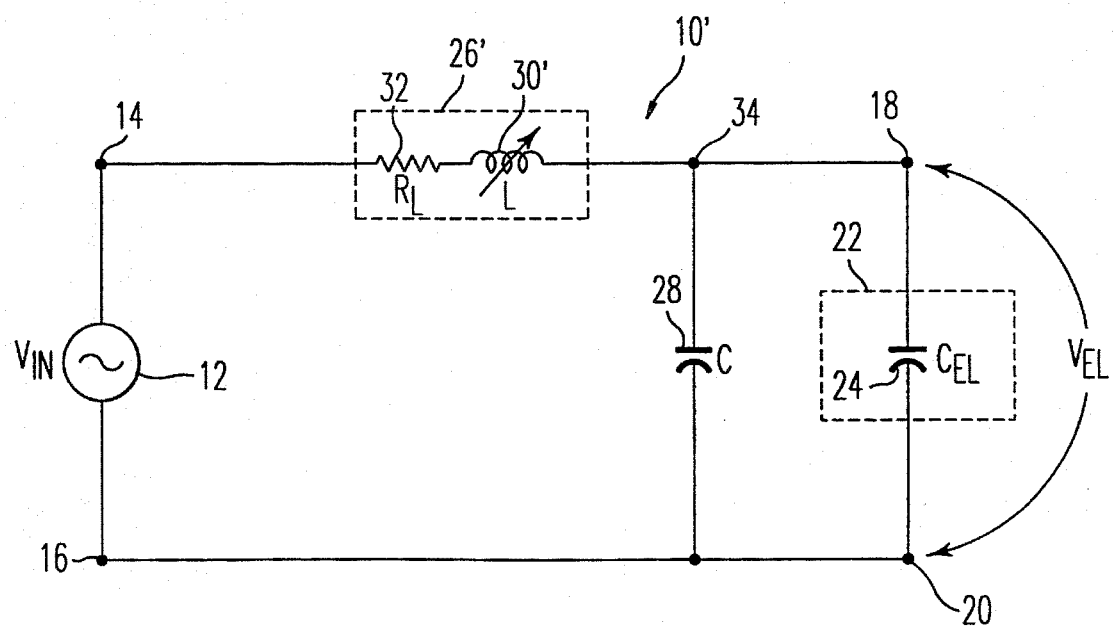
FIG. 2 is a schematic diagram of a modified electroluminescent panel operating circuit, employing a variable inductance element.
Figure 3:
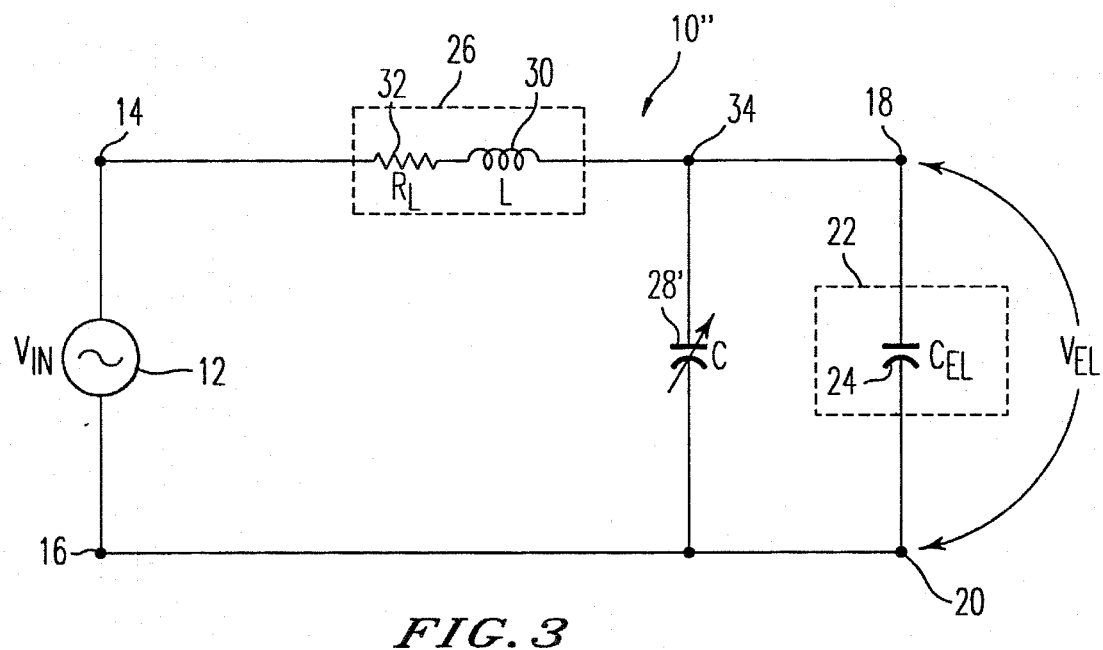
FIG. 3 is a schematic diagram of a further modification of an electroluminescent panel operating circuit, employing a variable capacitive element.
Figure 4:
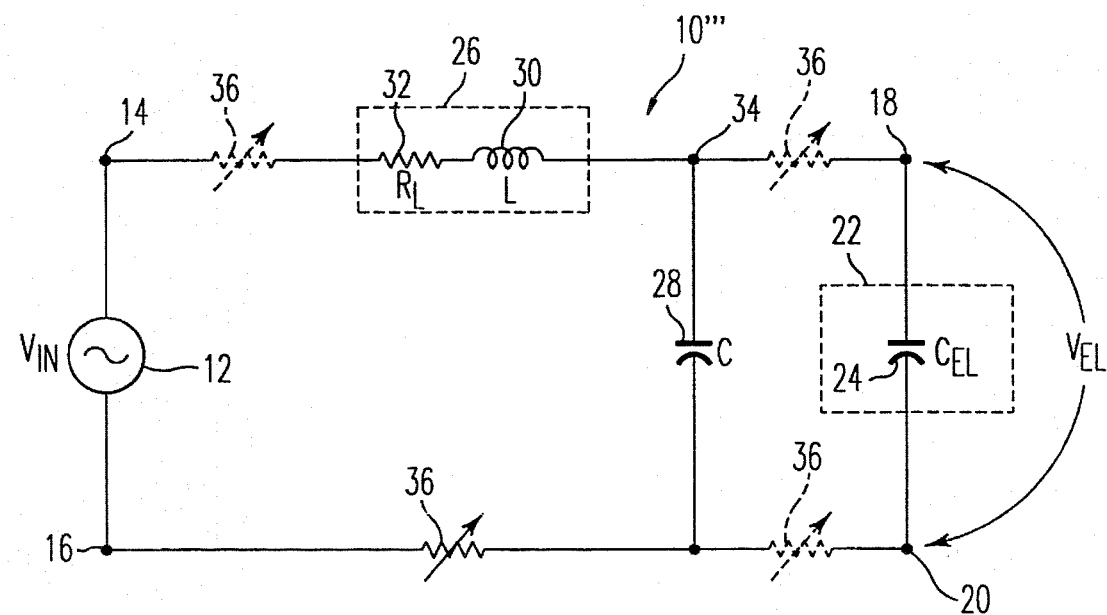
FIG. 4 is a schematic diagram of a still further modification of an electroluminescent panel operating circuit, employing a variable resistive element.

FIGS. 2–4 illustrate several possible modifications to the operating circuit 10 shown in FIG. 1. In the modified operating circuit 10' of FIG. 2, a variable inductance 30' has been substituted for the fixed-value inductance 30 of FIG. 1, in order to allow the impedance of the inductor 26' to be varied. This changes the voltage divider between the inductive and capacitive elements of the series resonant circuit, and thereby allows the panel voltage $V_{EL}$ to be increased or decreased as desired. The same effect is obtained in the modified operating circuit 10" of FIG. 3, where the fixed capacitor 28 of FIG. 1 is replaced a variable capacitor 28'. Since a variable capacitor is somewhat easier to implement than a variable inductor, the operating circuit of FIG. 3 may be preferable to that of FIG. 2. FIG. 4 illustrates a further modification in which a variable resistor 36 having a resistance range on the order of 0–10 Ω is connected between the input terminal 16 and output terminal 20 of the operating circuit 10'''. By increasing or decreasing the resistance value of the resistor 36, the panel voltage $V_{EL}$ can be decreased or increased as desired. Other possible locations for the variable resistor 36 are shown in phantom in FIG. 4. The variable resistor 36 of FIG. 4 is simpler to implement than the variable reactances of FIGS. 2 and 3, but introduces ohmic losses which cause increased power dissipation in the operating circuit 10''' as a whole.

Figure 5:
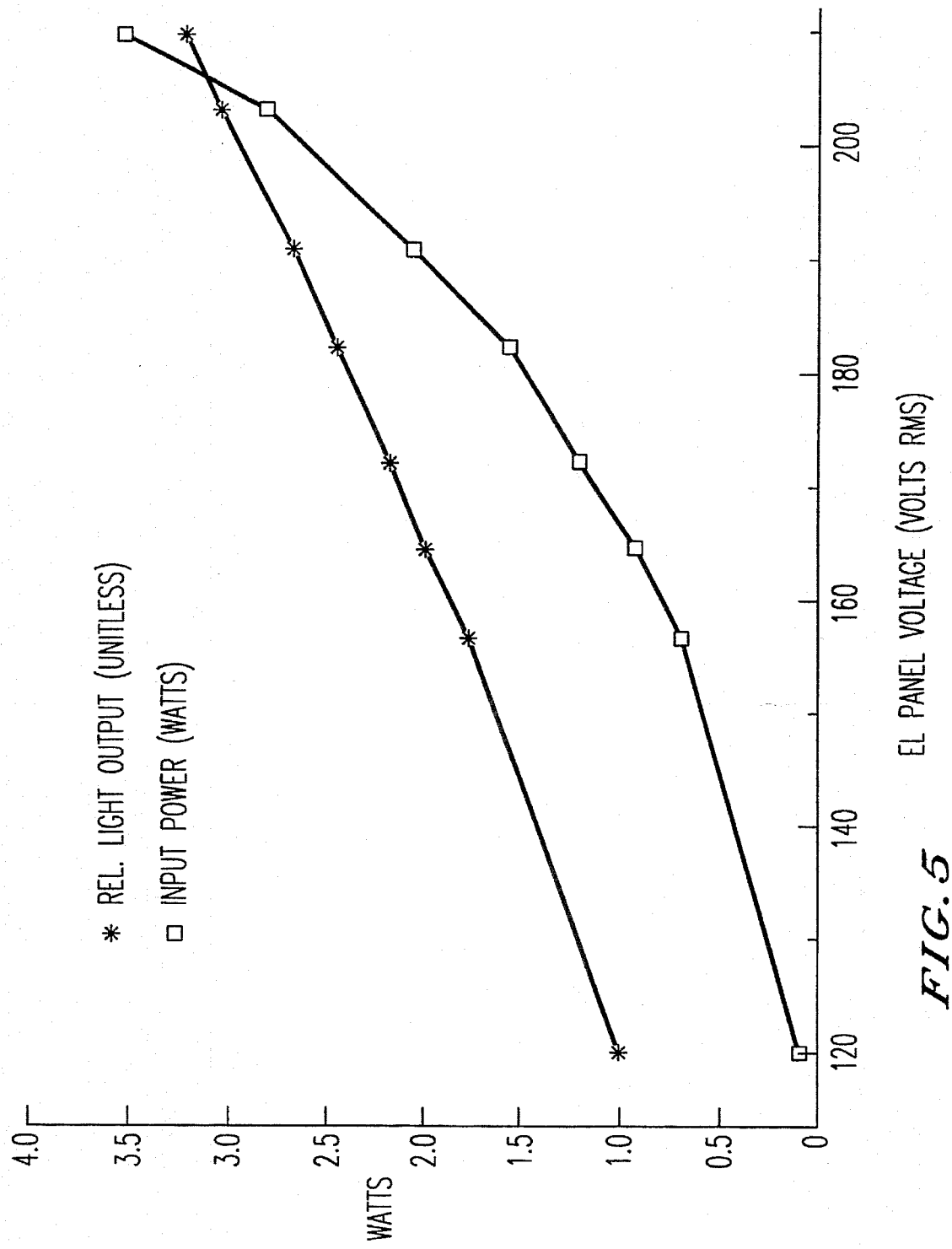
FIG. 5 is a graph which illustrates the variation in operating circuit power consumption and electroluminescent panel light output with applied panel voltage.

FIG. 5 is a graph which illustrates the relationship between the panel voltage $V_{EL}$ and both power consumption and panel brightness. The data points in FIG. 5 were obtained by using the operating circuit 10 of FIG. 1 (with the component values given earlier) and successively replacing the 1.14 μF capacitor 28 with several other capacitance values ranging from 0.99 μF to 1.60 μF. The electroluminescent panel 22 was a Part No. 704764 electroluminescent exit face manufactured by Lamplighter Industries of Oak Hill, W. Va. The horizontal axis of the graph represents the measured AC panel voltage $V_{EL}$ in volts RMS, and the vertical axis of the graph is calibrated in watts to represent the total measured power consumption of the operating circuit 10 (including the power dissipated by the electroluminescent panel 22 itself). Units have not been provided on the vertical axis for panel brightness, but the data points shown in the graph represent relative foot-candle readings obtained using a Minolta Model T-1 portable illuminance meter. As can be appreciated from FIG. 5, the circuit power consumption begins to rise more quickly than the light output from the electroluminescent panel 22 after the panel voltage $V_{EL}$ exceeds approximately 160 volts RMS, and hence any further increase in panel brightness is obtained at the expense of operating efficiency. In practice, the component values of the operating circuit 10 may be selected to limit the total power dissipation to a desired arbitrary value. Thus, for example, the components values given previously for the operating circuit 10 of FIG. 1 were selected to produce a total power dissipation of under 1 watt. This can be verified by noting that the 164.8 volt point on the horizontal axis of FIG. 5 corresponds to a power dissipation of just under 1 watt on the vertical axis.

It will be appreciated from the foregoing description that the operating circuit 10 is advantageous in that it allows the operating voltage and brightness of an electroluminescent panel to be increased by taking advantage of the intrinsic capacitance of the panel, without the need for a transformer and without significantly affecting the operating efficiency of the panel. The losses associated with the inductor 26 are significantly less than those which would occur with a transformer, since only a single coil is used and the core is normally smaller than a transformer core. The operating circuit is simple in construction and employs a small number of components, all of which are relatively inexpensive. Thus, it can be easily incorporated into exit signs, address plaques, and other lighting fixtures employing electroluminescent panels, without incurring a great deal of additional cost. The operating circuit 10 is also advantageous in that it can, if desired, be configured to allow the panel voltage $V_{EL}$ to varied, as described in connection with the modified operating circuits 10', 10" and 10'" of FIGS. 2–4.

While only a limited number of exemplary embodiments have been chosen to illustrate the present invention, it will be understood by those skilled in the art that various modifications can be made therein. For example, the intrinsic capacitance $C_{EL}$ of the electroluminescent panel 22 may in some cases be sufficient in and of itself to provide the required capacitance for the series resonant circuit, without the need to connect a discrete capacitor 28 or 28' in parallel with the panel. All such modifications are intended to fall within the spirit and scope of the invention as defined in the appended claims.

What is claimed is:

1. An operating circuit for increasing the voltage across an electroluminescent panel, comprising:

first and second input terminals adapted to be connected to an AC voltage source;

a series resonant circuit including an inductor and a capacitor connected in series with each other, said series resonant circuit being connected across said first and second input terminals; and first and second output terminals adapted to be connected to an electroluminescent panel, said first output terminal being connected to the node between said inductor and one terminal of said capacitor and said second output terminal being connected to a second terminal of said capacitor, whereby said electroluminescent panel is connected in parallel with said capacitor;

wherein the values of said inductor and said capacitor are selected to produce an AC voltage across said output terminals that is greater than the AC voltage of said source when an electroluminescent panel is connected to said output terminals.

2. An operating circuit as claimed in claim 1, wherein said inductor includes a winding resistance.

3. An operating circuit as claimed in claim 1, wherein at least one of said inductor and said capacitor is variable in order to vary the AC voltage across said output terminals.

4. An operating circuit as claimed in claim 1, further comprising a resistor connected in series with at least one of said inductor, said capacitor, and said first and second input and output terminals.

5. An operating circuit as claimed in claim 4, wherein said resistor is variable in order to vary the voltage across said output terminals.

6. An operating circuit as claimed in claim 1, wherein the values of said inductor and said capacitor are selected to produce a resonant frequency of said series resonant circuit that is different from the frequency of said AC voltage source when an electroluminescent panel is connected to said output terminals.

7. An electroluminescent panel circuit, comprising:

an AC voltage source; and a series resonant circuit connected across said AC voltage source and having as an element thereof an electroluminescent panel having an intrinsic capacitance, said series resonant circuit having an inductance value and a capacitance value, said capacitance value comprising at least in part the intrinsic capacitance of said electroluminescent panel;

wherein at least one of said inductance value and said capacitance value is selected to produce an AC voltage across said electroluminescent panel that is greater than the AC voltage of said source;

wherein said series resonant circuit includes an inductor to provide said inductance value, said inductor having a winding resistance; and wherein said series resonant circuit further comprises a capacitor connected in parallel with said electroluminescent panel to provide said series resonant circuit with a capacitance value greater than the intrinsic capacitance of said electroluminescent panel.

8. An electroluminescent panel circuit as claimed in claim 7, wherein at least one of said inductor and said capacitor is variable in order to vary the AC voltage across said electroluminescent panel.

9. An electroluminescent panel circuit as claimed in claim 7, further comprising a resistor connected in said series resonant circuit.

10. An electroluminescent panel circuit as claimed in claim 9, wherein said resistor is variable in order to vary the voltage across said electroluminescent panel.

11. An electroluminescent panel circuit, comprising:

an AC voltage source; and a series resonant circuit connected across said AC voltage source and having as an element thereof an electroluminescent panel having an intrinsic capacitance, said series resonant circuit having an inductance value and a capacitance value, said capacitance value comprising at least in part the intrinsic capacitance of said electroluminescent panel;

wherein at least one of said inductance value and said capacitance value is selected to produce an AC voltage across said electroluminescent panel that is greater than the AC voltage of said source; and wherein said AC voltage source has a source frequency, and wherein at least one of said inductance value and said capacitance value is selected to produce a resonant frequency of said series resonant circuit that is different from said source frequency.

12. A method for increasing the voltage across an electroluminescent panel having an intrinsic capacitance, comprising of the steps of:

connecting said electroluminescent panel into a series resonant circuit having an inductance value and a capacitance value, said capacitance value comprising at least in part the intrinsic capacitance of said electroluminescent panel;

connecting said series resonant circuit across an AC voltage source; and selecting at least one of said inductance value and said capacitance value to produce an AC voltage across said electroluminescent panel that is greater than the AC voltage of said source;

wherein said AC voltage source has a source frequency, and wherein the step of selecting at least one of said inductance value and said capacitance value produces a resonant frequency of said series resonant circuit that is different from said source frequency.

13. A method as claimed in claim 12, further comprising the steps of providing said series resonant circuit with a series resistance in order to stabilize said resonant circuit.

14. A method as claimed in claim 12, further comprising the steps of providing said resonant circuit with a resistance, and varying said resistance in order to vary the voltage across said electroluminescent panel.

15. A method as claimed in claim 12, further comprising the step of varying at least one of said inductance value and said capacitance value in order to vary the AC voltage across said electroluminescent panel.

* * * * *